June 2, 1925.                G. N. HEIN                1,540,126
PISTON CONSTRUCTION
Filed July 1, 1924
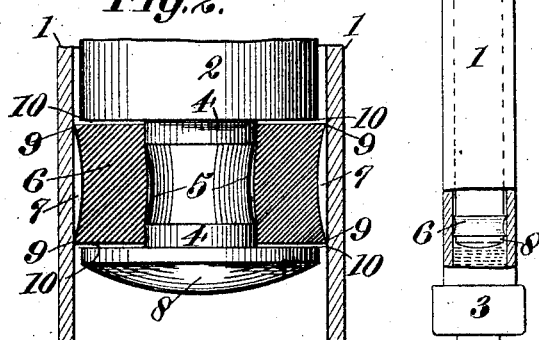
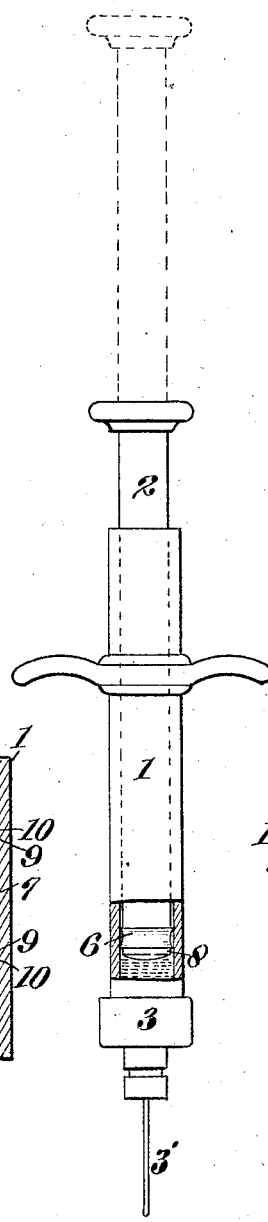
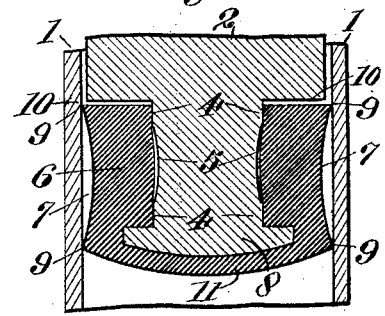
Inventor.
George N. Hein
By Harry A. Potter
        Attorney.

Patented June 2, 1925.

1,540,126

UNITED STATES PATENT OFFICE.

GEORGE N. HEIN, OF SAN FRANCISCO, CALIFORNIA.

PISTON CONSTRUCTION.

Application filed July 1, 1924. Serial No. 723,531.

*To all whom it may concern:*

Be it known that I, GEORGE N. HEIN, a citizen of the United States, residing in the city and county of San Francisco, and State of California, have invented certain new and useful Improvements in Piston Constructions, of which the following is a specification.

This invention relates to piston construction. The object of the invention is to produce a packing washer which is inexpensive to manufacture and which may be applied to or removed from the piston with great ease.

Another object of the invention is to produce a packing washer which may be universally used in any type of hypodermic syringe now upon the market, especially so in syringes which have bores of slightly varying caliber.

A further object is to provide a packing washer so constructed as to produce a minimum amount of piston friction, thereby enabling the operator to regulate the pressure upon the penetrated tissue to a certainty.

With the above mentioned and other objects in view, the invention consists in the novel construction and combination of parts hereinafter described, illustrated in the accompanying drawings, and set forth in the claims hereto annexed, it being understood that various changes in the form, proportion, size and minor details of construction within the scope of the claims may be resorted to without departing from the spirit or sacrificing any of the advantages of the invention.

In the accompanying drawings:

Fig. 1 is a view in elevation of a syringe, the lower portion of the barrel being broken away to show the novel piston construction.

Fig. 2 is an elevation, partly in section, and enlarged, showing in detail the piston-construction.

Fig. 3 is a similar view showing a modification of the piston construction.

In the drawings, wherein like characters of reference designate corresponding parts, 1 indicates a cylindrical barrel which is open at one end to allow the piston 2 to be inserted therein, and supporting at its opposite end a detachable coupling 3 which serves to mount a hypodermic needle 3'. The end of the piston 2 mounts a packing washer 6 held in position and constructed as hereinafter described. The lower portion of the piston 2 is reduced to form upper and lower shoulders 4, and between these shoulders said reduced portion is circumferentially grooved at 5. The packing washer 6 is made of rubber tubing or other suitable elastic material, the diameter of which is normally greater than the bore of the tubular barrel, and the bore of said washer is less than the diameter of the reduced portion of the piston, thus effecting a tight fit of the packing washer about the reduced portion of the piston, the washer being held securely by the lower portion or retaining head 8. The washer is a trifle smaller in length than the reduced portion of the piston thus leaving the spaces 10 at each end of the washer, so as not to confine the same too closely, thus allowing compression and expansion. To place the packing washer 6 in position, the piston is withdrawn from the barrel and the washer forced over the retaining head 8 and allowed to contract upon the shoulders 4 of the reduced portions of the piston causing the center to intrude into the circumferential groove 5 of the reduced portion. The intrusion of the washer into said groove causes the outer surface of the washer to become concaved, as shown at 7, thus producing the circumferential feathered edges 9 which fit snugly against the tubular barrel of the syringe, thus making an air tight packing. These feathered edges produced by the circumferential groove insure the maximum liquid sealing effect with a minimum of piston friction, thereby enabling the operator to regulate the pressure produced in the tissue to a certainty.

A modified form of construction is shown in Fig. 3 of the drawings wherein the same piston-construction is resorted to, except that the lower end of the piston, which forms the retaining head 8 for the washer, is of a less diameter than the upper portion of the piston. The packing washer extends downward and covers the retainer head 8 as shown at 11, thus protecting said head from danger of breakage, also the barrel of syringe especially one of glass.

I claim:—

1. A piston-construction especially adapted for syringes, comprising a piston, the lower portion of which is reduced, and said reduced portion circumferentially grooved leaving continuous circumferential shoulders on said reduced portion at the head and foot of said groove, and a yielding packing washer fitted to said reduced portion.

2. A piston-construction especially adapted for syringes, comprising a piston, the lower portion of which is reduced, and said reduced portion circumferentially grooved leaving continuous circumferential shoulders on said reduced portion at the head and foot of said groove, and an elastic packing washer stretched over said reduced portion.

3. A piston-construction especially adapted for syringes, comprising a piston, having its lower portion reduced and said reduced portion being circumferentially grooved leaving shoulders on said reduced portion at the head and foot of said groove; and a yielding packing washer fitted to said reduced portion, the bore of said washer having a normal interior diameter less than the diameter of the reduced portion through the shoulders whereby it is caused to intrude into the circumferential groove of the reduced portion.

4. In a syringe, a piston having its lower portion reduced, said reduced portion being circumferentially grooved leaving upper and lower shoulders; and a tubular yielding packing washer stretched over said reduced portion, the bore of said washer having a normal inner diameter less than the reduced portion of the piston, and said washer having a length slightly less than that of said reduced portion, whereby the washer is caused to intrude into the groove of the said reduced portion and the upper and lower edges of the washer are caused by the shoulders to expand outwardly to contact with the bore of the syringe barrel.

5. A piston-construction especially adapted for syringes, comprising a piston, the lower portion of which is reduced, and said reduced portion circumferentially grooved leaving shoulders on said reduced portion at the head and foot of said groove; and a yielding packing washer fitted to said reduced portion and covering the end of the piston.

6. A piston-construction adapted for syringes comprising a piston, the lower portion of which is reduced and said reduced portion is circumferentially grooved providing shoulders on said reduced portion at the head and foot of said groove and a tubular elastic packing washer into the bore of which said reduced portion extends, with the opposite ends of said washer resting on said shoulders, and its central portion extending into said circumferential groove.

7. A piston construction comprising a piston provided with a reduced portion which is circumferentially grooved forming shoulders on said reduced portion adjacent to its ends, and an elastic packing fitted into said reduced portion, the periphery of which is circumferentially concaved overlying said circumferential groove, and is provided with circumferential feathered edges at its opposite ends.

8. A piston construction adapted for syringes comprising a piston provided with a packing supporting portion, a pair of packing confining walls extending beyond the packing supporting portion, the packing supporting portion being circumferentially grooved providing circumferential shoulders one adjacent to each confining wall, and a tubular elastic packing between said confining walls and through the bore of which said packing supporting portion extends, with the shoulders exerting expanding pressure on the ends of said packing.

In testimony whereof I have signed my name to this specification.

GEORGE N. HEIN.